United States Patent [19]

Nash

[11] Patent Number: 5,176,323
[45] Date of Patent: Jan. 5, 1993

[54] REDUCED WEIGHT NOZZLE ACTUATION MECHANISM

[75] Inventor: Dudley O. Nash, Cincinnati, Ohio

[73] Assignee: General Electric Company, Cincinnati, Ohio

[21] Appl. No.: 685,096

[22] Filed: Apr. 15, 1991

[51] Int. Cl.$^5$ ................................. F02K 1/12
[52] U.S. Cl. ......................... 239/265.41; 239/265.39
[58] Field of Search ............... 239/265.19, 265.33, 239/265.37, 265.39, 265.41

[56] References Cited

U.S. PATENT DOCUMENTS

| | | | |
|---|---|---|---|
| 2,597,253 | 5/1952 | Melchior | 239/265.39 X |
| 2,726,509 | 12/1955 | Gist et al. | 239/265.39 |
| 2,780,056 | 2/1957 | Colley | 239/265.41 |
| 2,932,163 | 4/1960 | Hyde | 239/265.41 |
| 3,004,385 | 10/1961 | Spears, Jr. et al. | 239/265.41 |
| 3,426,974 | 2/1969 | Pendoley, Jr. et al. | 239/265.39 |
| 3,730,436 | 5/1973 | Madden et al. | 239/265.39 |
| 3,820,720 | 6/1974 | Anders et al. | 239/265.39 |
| 3,954,225 | 5/1976 | Camboulives et al. | 239/265.41 |
| 4,181,260 | 1/1980 | Nash | 239/265.39 |
| 4,447,009 | 5/1984 | Wiley et al. | 239/265.39 |
| 4,641,783 | 2/1987 | Camboulives | 239/265.39 |
| 4,817,871 | 4/1989 | Berneuil et al. | 239/265.39 |
| 5,082,182 | 1/1992 | Bruchez, Jr. et al. | 239/265.19 X |

Primary Examiner—Andres Kashnikow
Assistant Examiner—William Grant
Attorney, Agent, or Firm—Jerome C. Squillaro

[57] ABSTRACT

A fluid supply and synchronizing mechanism are provided for a jet engine exhaust nozzle. The exhaust nozzle has flaps which are moved by flap mounted actuators which move with the flaps. The fluid supply includes a supply tube, a return tube and a strut for each actuator. The two tubes and strut are connected to each actuator for movement with the actuator. The strut prevents flexing of the tubes during movement. The synchronizing mechanism interconnects the flaps so that movement of any one flap is transmitted to all other flaps thereby retaining nozzle symmetry.

17 Claims, 5 Drawing Sheets

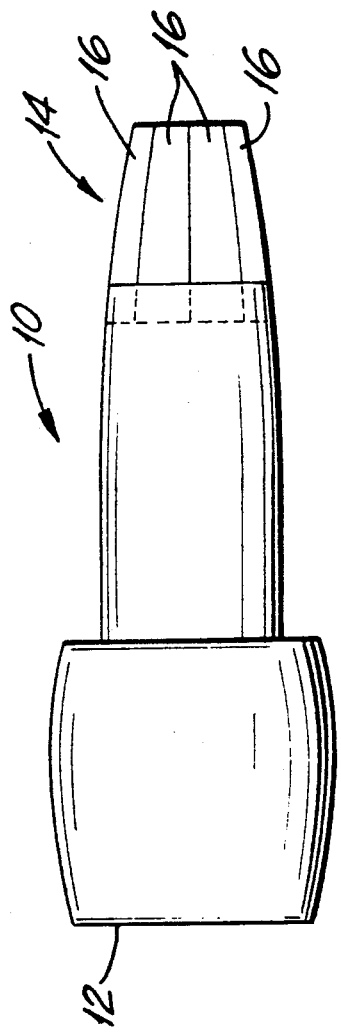
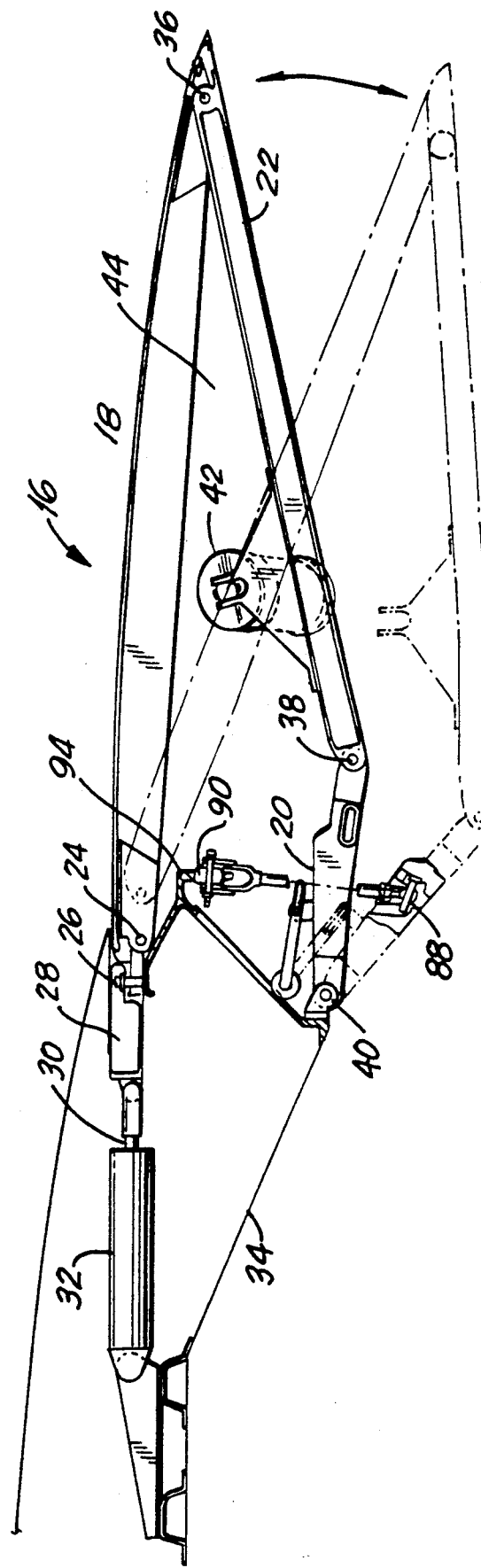
FIG.1
FIG.2

REDUCED WEIGHT NOZZLE ACTUATION MECHANISM

BACKGROUND OF THE INVENTION

This invention relates to the actuation of axisymmetric, variable area exhaust nozzles, and more particularly to improved synchronization of and fluid supply to flap mounted actuators.

Early jet engine exhaust nozzles were relatively short and required relatively low actuation forces. As nozzle designs improved, in order to achieve increased installed performance, the nozzles have generally increased in length which resulted in longer and heavier nozzle flaps which must be moved as the engine thrust and constants are changed during flight. It is not unusual for a force of 40,000 pounds to be required to move a set of nozzle flaps.

The high nozzle actuation forces required heavier actuation mechanisms and structures to transmit the increased forces, e.g., nozzle actuators, actuation rings, actuation mounting structures and force reacting structures. The heavier structures lead to inefficient aircraft design, since the weight of an engine exhaust nozzle is critical. This is particularly true in high performance aircraft in which the exhaust nozzles tend to be located at the rear of the aircraft rather than under the wings, so that the aircraft contours can be blended to exhaust nozzle contours resulting in a low drag, high performance installation. With the nozzles located at the rear of the aircraft, a relatively small weight change in the nozzle can result in a large effect in the aircraft weight distribution and balance. In some aircraft designs, it has been necessary to add weight in the nose of the aircraft to compensate for a tail heavy condition.

The heavier actuation mechanisms and force reacting structures can be eliminated by mounting the flap actuators directly on the flaps. The flap mounted actuators not only eliminate items such as actuation rings, cams and rollers, but reduce the force necessary to move the flaps. However, the actuation rings which are eliminated, also serve to synchronize the actuation of the flaps so as to retain the axisymmetric nozzle symmetry, i.e., essentially round.

There have been attempts to use flap mounted actuators such as the hydraulic actuation ring described in U.S. Pat. No. 4,181,260 assigned to the assignee of the present invention. The hydraulic actuation ring interconnects the nozzle flaps with an array of actuators. The motion of the actuators is synchronized by lubricated screws and gears, and unbalanced loading on the flaps is reacted by a system of guide rollers incorporated into the rigid actuator housing design. The hydraulic actuation ring requires extreme precision in manufacturing the segments of the array so that the actuators do not bind. The near perfect fit which is required also results in excessive manufacturing costs.

There have also been attempts to synchronize flap movement to maintain a nozzle in round when using apparently less rigid ring actuated flaps such as the flap synchronizing control described in U.S. Pat. No. 3,820,720. The synchronizing control consists of male and female members mounted on each flap so that male and female members on adjacent flaps engage. The synchronizing control tends to add rigidity to a flap array, but does not positively synchronize the movement of the flaps so that movement of any one flap is transmitted to all others.

The movement of the flap mounted actuators together with the flaps causes the fluid supply lines to the actuators to move and flex. While some minimal flexure of the supply lines can be tolerated, the elimination of supply line flexure, does away with the need for sturdier, heavier lines and a potential point of failure and maintenance.

While there have been improvements in exhaust nozzle design, still further improvements would be beneficial. These improvements would be particularly beneficial as they reduce the weight of the exhaust nozzle actuation mechanisms, improve manufacturing tolerances, improve reliability and reduce cost.

SUMMARY OF THE INVENTION

Accordingly, it is an object of the present invention to provide an improved variable area exhaust nozzle.

Another object of the present invention is to provide an improved exhaust nozzle actuation mechanism having reduced weight.

A further object of the present invention is to provide an exhaust nozzle with low cost, unsynchronized flap mounted actuators.

Another object of the present invention is to provide an improved synchronizing of nozzle flap motion.

Still another object of the present invention is to provide an improved fluid supply mechanism for flap mounted actuators.

A further object of the present invention is to provide an improved actuation arrangement for independently controlling the throat area and discharge area of a nozzle.

Another object of the present invention is to provide an improved synchronizing mechanism for flap motion so that all flaps move uniformly, and maintain a circular nozzle cross section.

A still further object of the present invention is to provide an improved fluid supply mechanism for flap mounted actuators which permits the fluid carrying tubes to move with the actuators without flexing the tubes.

Briefly, in accordance with the present invention there is provided a polygonal array of fluid actuated actuators for an exhaust nozzle of a jet engine. The exhaust nozzle includes a circumferential arrangement of flap sets in which each flap set consists of an interconnected convergent, divergent and outer flap. The actuators are oriented circumferentially in an annular nozzle cavity defined by the space between the circumferential arrangement of convergent, divergent and outer flaps. In a preferred embodiment, each actuator has a first end mounted on a divergent flap and viewing the nozzle from the rear and moving counterclockwise, a second end mounted on a circumferentially adjacent divergent flap so that each flap is connected to the counterclockwise adjacent flap. Each convergent flap is connected to a synchronizing mechanism which interconnects each convergent flap to all other convergent flaps so that the convergent flaps move uniformly, and the movement of any one convergent flap is transmitted to and moves all other convergent flaps. In each flap set, the convergent, divergent and outer flaps are interconnected as part of a kinematic linkage so that the convergent, divergent and outer flaps move in a fixed relationship to one another.

When the actuators are actuated to move the divergent flaps to vary the nozzle area, the movement of each divergent flap is imparted to its related convergent flap in its flap set, which convergent flap in turn transmits its motion to all other convergent flaps which impart movement to all related divergent flaps and outer flaps resulting in all flaps moving uniformly in synchronism.

In another embodiment of the invention, each actuator has a first end mounted on a convergent flap and a second end mounted on the counterclockwise circumferentially adjacent convergent flap so that each convergent flap is connected to the counterclockwise adjacent flap. In addition, each convergent flap is connected to a synchronizing mechanism which interconnects each convergent flap to all other convergent flaps so that the convergent flaps move uniformly, and the movement of any one convergent flap is transmitted to and moves all other convergent flaps.

In this embodiment, when the actuators are actuated to move the convergent flaps, each convergent flap moves in unison with the other convergent flaps. Also each divergent flap and outer flap as part of a kinematic linkage moves in a fixed relationship with its related convergent flap.

There is also provided a fluid supply to the actuators through fluid carrying tubes which move with the actuators and flaps. This is accomplished without flexing the tubes by connecting the tubes to a rotary union which is in turn mounted for axial and lateral movement. As the flaps and actuators move up and down to open and close the nozzle, the rotary union provides a pivot about which the supply tubes can rotate and the rotary union translates slightly to compensate for axial and lateral movement of the actuators as the flaps move.

In the preferred embodiment of the invention, the outer flaps may be independently actuated to permit adjustment of the throat area and discharge area independently. By coordinating the movements of the outer flap actuators and flap mounted actuators, although the outer flap actuators work through a ring, they only move a small load and therefore the actuators and related mechanisms are light weight.

The aforementioned objects, features and advantages of the invention, will, in part, be pointed out with particularity, and will, in part, become obvious from the following more detailed description of the invention taken, in part, with the drawings which form an integral part thereof.

BRIEF DESCRIPTION OF THE DRAWINGS

In the Drawings:

FIG. 1 is an overview of a jet aircraft engine with a variable area exhaust nozzle employing the principles of the present invention;

FIG. 2 is a view of a single set of exhaust flaps of a nozzle having independently variable throat and discharge areas with flap actuators mounted on divergent flaps made in accordance with the principles of the present invention;

In the various figures of the drawing like reference characters designate like parts.

DETAILED DESCRIPTION OF THE PREFERRED EMBODIMENT

Figure 3:
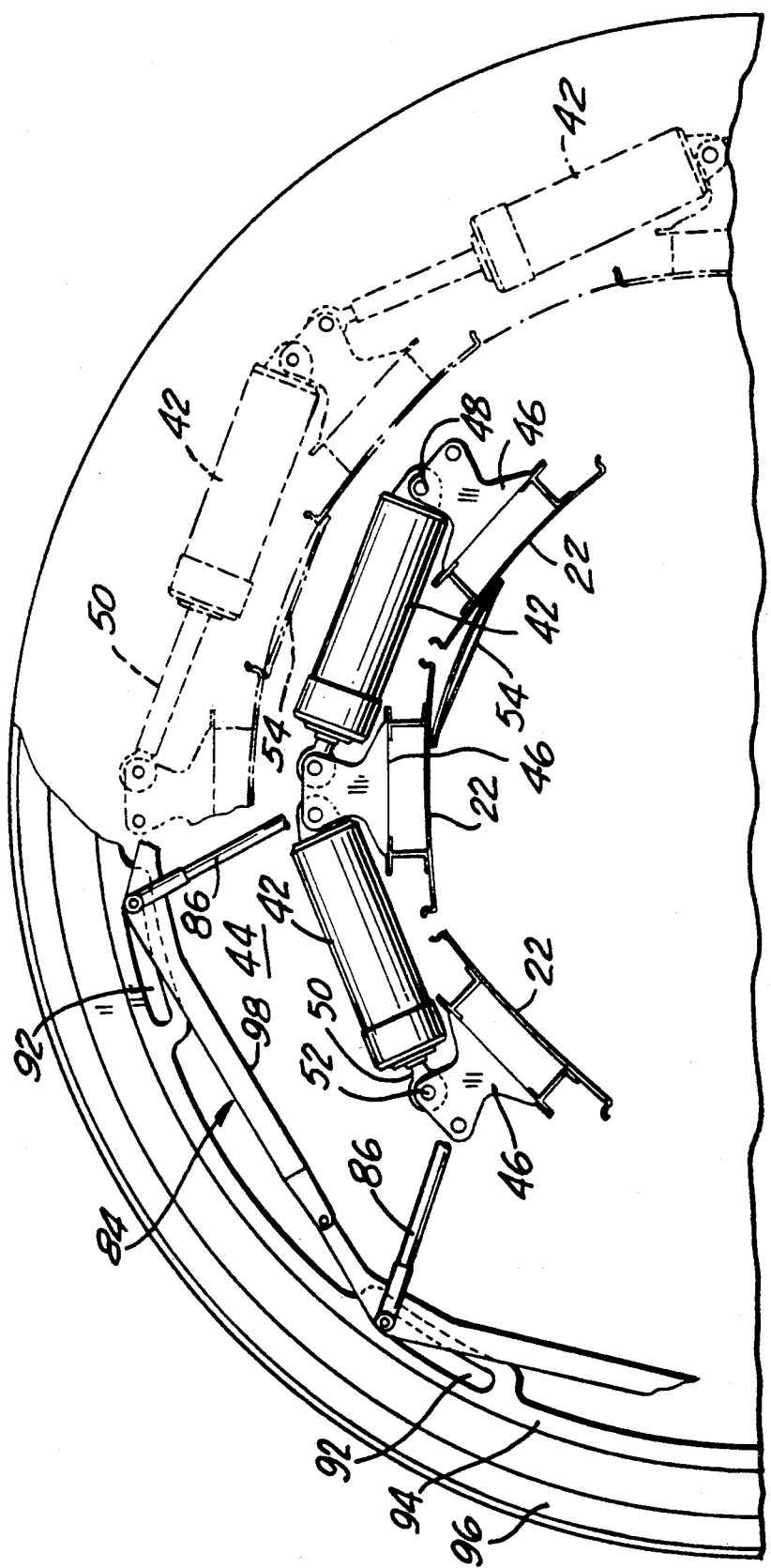
FIG. 3 is a fragmentary view of one half of a nozzle looking in from the rear of the nozzle showing flap mounted actuators in open and closed positions, and a partial view of a synchronizing mechanism.

Referring now to the drawings, there is shown in FIG. 1 a jet aircraft engine generally designated as 10. Engine 10 may be supported by an aircraft structure such as a wing by a conventional pylon or may be mounted in other convenient locations, e.g., in or attached to the tail structure.

Engine 10 is a gas turbine engine through which air enters at air intake 12 and is heated by burning fuel thereby increasing the volume of air. The combustion discharge gases are passed to the atmosphere through a variable area convergent-divergent exhaust nozzle 14. The combustion discharge gasses enter the nozzle at relatively high pressure and low velocity and are accelerated in the convergent area of the nozzle to sonic speed and are accelerated in the divergent area of the nozzle to supersonic speed.

Referring also to FIG. 2, nozzle 14 is made up of a series of flap sets 16 circumferentially spaced axisymmetrically about the center line of the engine. For purposes of description, there are eight flap sets 16 which form the nozzle. As shown in FIG. 2, each flap set 16 consists of an outer flap 18, a convergent flap 20 and a divergent flap 22, which are interconnected.

Outer flap 18 is rotatably connected at its forward end by a pin 24 and bolt 26 to an actuation ring 28. Actuation ring 28 is in turn connected to piston rod 30 of piston 32 which is mounted on an exhaust duct wall 34 of the engine structure. The aft end of outer flap 18 is rotatably connected by a pin 36 to the aft end of divergent flap 22. The forward end of divergent flap 22 is rotatably connected by a pin 38 to the aft end of convergent flap 20. The forward end of convergent flap 20 is rotatably connected by pin 40 to the exhaust duct wall 34.

When piston 32 is activated to move piston rod 30 to the right, the outer flap acts as a compression link and causes the aft end of outer flap 18 and divergent flap 22 to move down. When piston rod 30 is drawn into piston 32 and moves to the left, the aft end of outer flap 18 and divergent flap 22 moves up. The aft ends of all the divergent flaps 22 of the circumferentially spaced flap sets form a generally round axisymmetrical discharge area of the exhaust nozzle 14. The generally round shape of the discharge area is maintained by the outer flaps being moved synchronously by actuation ring 28.

While independent movement of the outer flaps 18 results in an independently variable discharge area which provides significant performance benefits, in the prior art high actuation forces were required which rendered the structural weight necessary to transmit those forces excessive. Flap mounted actuators used in combination with the outer flap actuators, as will be described, leaves relatively small forces for the outer flap actuators to overcome. Accordingly, in an eight flap array, it is not necessary to have a piston 32 for each outer flap. Rather a smaller number of piston equally spaced about the circumference of the duct wall 34 and attached to actuation ring 28 is sufficient. In addition, because of the small forces to be overcome, the actuating ring and structure is of relatively light weight.

Referring also to FIG. 3, for purposes of description a polygonal array of eight actuators 42 which are typically hydraulic fluid actuated pistons, are circumferentially located in an annular nozzle cavity 44 formed by the outer, convergent and divergent flaps. As will be described, each actuator is mounted on and connected to two adjacent divergent flaps. Each divergent flap 22 has a pedestal 46 mounted thereon and extending into the nozzle cavity 44. Each actuator 42 is pivotally connected at its first or right end as viewed in FIG. 3 to a pedestal 46 by a suitable pin or bolt 48 and each actuator through its associated piston rod 50 is pivotally connected at its second or left end to an adjacent pedestal 46 on a counterclockwise adjacent divergent flap 22 by a suitable pin or bolt 52. As can readily be appreciated, when the actuators are in their retracted state with their piston rods 50 fully within their cylinders, the divergent nozzle will be in its maximum closed position and provide the minimum throat area. When the actuators 42 are extended, the piston rods move to the left in effect pushing the divergent flaps apart. Since the flaps can not move apart, the flaps move upward about their respective pivots and are therefore further apart to accommodate the extended piston rods. Conversely, when the pistons are retracted, the flaps move downward to be closer together. The motion described is shown in FIG. 3 with divergent flaps 22 in the closed position shown with pistons 42 depicted in solid lines and divergent flaps 22 in the open position with the pistons 42 depicted in dotted lines. There is also shown a typical divergent flap seal 54 which is between two divergent flaps. In practice, a seal is positioned between each two adjacent divergent flaps to form the divergent nozzle.

Providing hydraulic fluid to the actuators is a problem since as the actuators move up and down with the divergent flaps, the fluid supply lines connected to the actuators will constantly be moving up and down and flexing over a broad range of motion. The flexing of the supply lines requires heavier supply lines to withstand the stress, and creates a point of failure and maintenance. In order to solve the fluid supply problem, the present invention utilizes an arrangement wherein the fluid supply lines move with the actuators without flexing.

Figure 4:
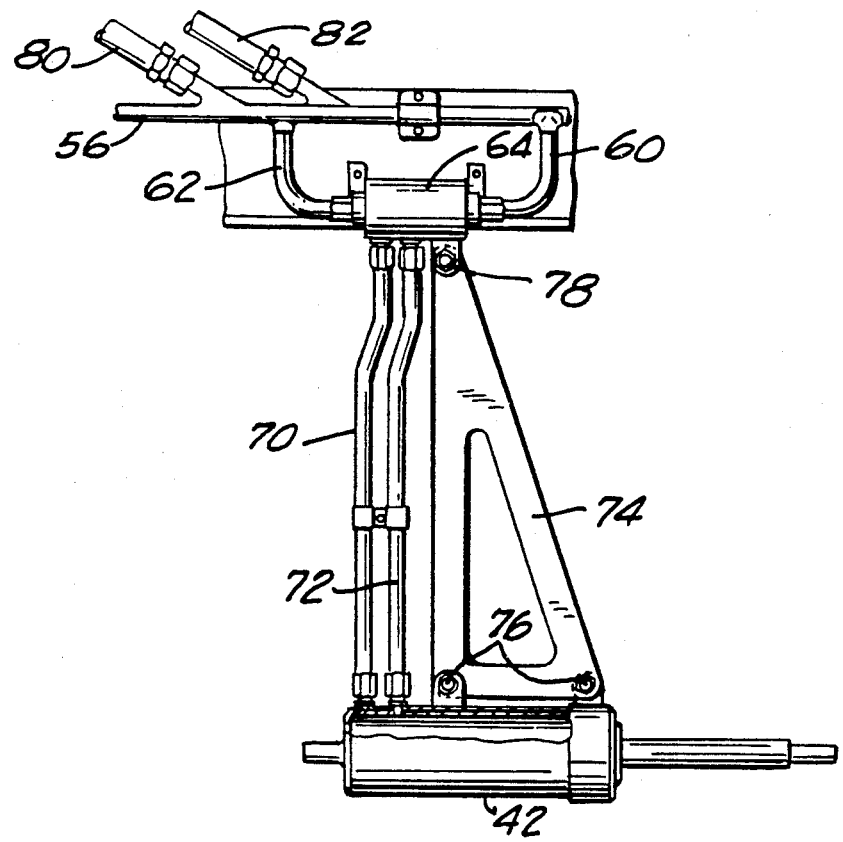
FIG. 4 is a top view of a fluid supply arrangement which moves with its associated actuator and flaps made in accordance with the principles of the present invention.
Figure 5:
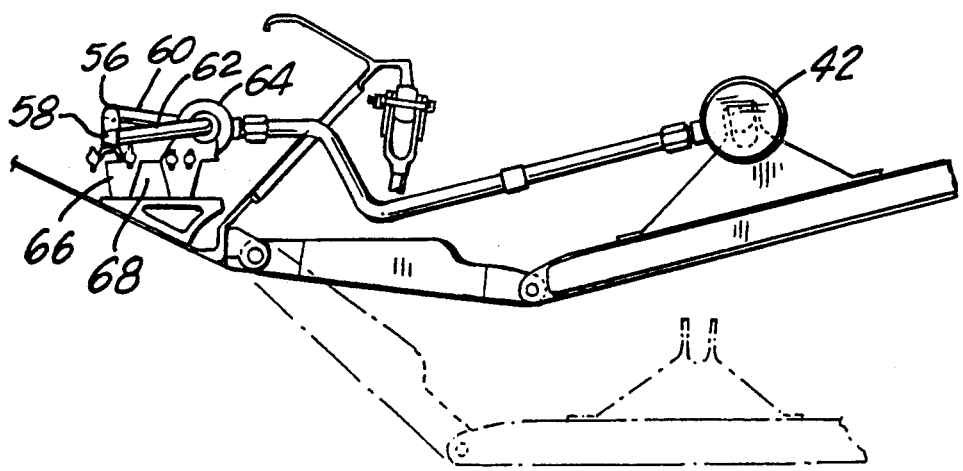
FIG. 5 is an end view of the fluid supply arrangement shown in FIG. 4 showing the movement of the fluid supply with its associated actuator and flaps.

In particular, as shown in FIGS. 4 and 5 a fluid supply manifold 56 which encircles the exhaust duct wall 34 and a fluid return manifold 58 which is directly beneath supply manifold 56 and also encircles the exhaust duct wall 34 are connected by jumper tubes 60, 62 respectively, to a fluid swivel joint or rotary union 64. The manifolds 56, 58 and rotary union 64 are mounted on a "W" shaped support ring 66 which in turn is mounted on and rides on a support ring guide rail 68 which is secured to the exhaust duct wall 34. Each actuator 42 has an associated fluid supply. Rotary union 64 is connected to actuator 42 by a supply tube 70 and a return tube 72. A rigid strut 74 is rigidly connected at one end by bolts 76 to the actuator 42 and at the other end by bolt 78 to the rotary union 64.

The hydraulic circuit flow is from flexible supply hose 80 from a source of fluid (not shown) into supply manifold 56, then through jumper tube 60, rotary union 64 and supply tube 70 into actuator 42. The circuit is completed by returning fluid through return tube 72, rotary union 64, jumper tube 62 and into return manifold 58 and out flexible return hose 82.

As the nozzle area is varied by the eight actuators which move with the eight divergent flaps, the actuators translate both radially with the flaps and tangentially a small amount to compensate for displacement of the rotational axes of the flaps and actuators. The tangential displacement is shown in FIG. 4. As an actuator 42 shown in solid lines moves downward (FIG. 5) the actuator moves downward and translates to the right. Since the actuator 42 is connected by a rigid strut 74 to the rotary union 64, when the actuator translates tangentially to the dotted position, the rotary union 64 must translate to the right to the dotted line position. The tangential movement of the rotary union is accommodated by support ring 66 moving tangentially on guide rail 68. The total tangential movement is around one inch and is easily accommodated by flexible hoses 80, 82 without stressing the hoses. The rigid strut 74 prevents any flexing of the supply and return tubes 70, 72 over the wide range of divergent flap movement and transmits all forces between the actuator and the rotary union.

Since the actuators 42 are each independently operated, each actuator may not provide the same degree of actuation to its associated pair of flaps and may cause the nozzle to loose symmetry. There is no actuation ring or cams or links through which the actuators 42 operate to position all flaps at the same angle thus assuring nozzle symmetry. The present invention assures nozzle symmetry through a light weight synchronizing mechanism or symmetry controller 84.

Figure 6:
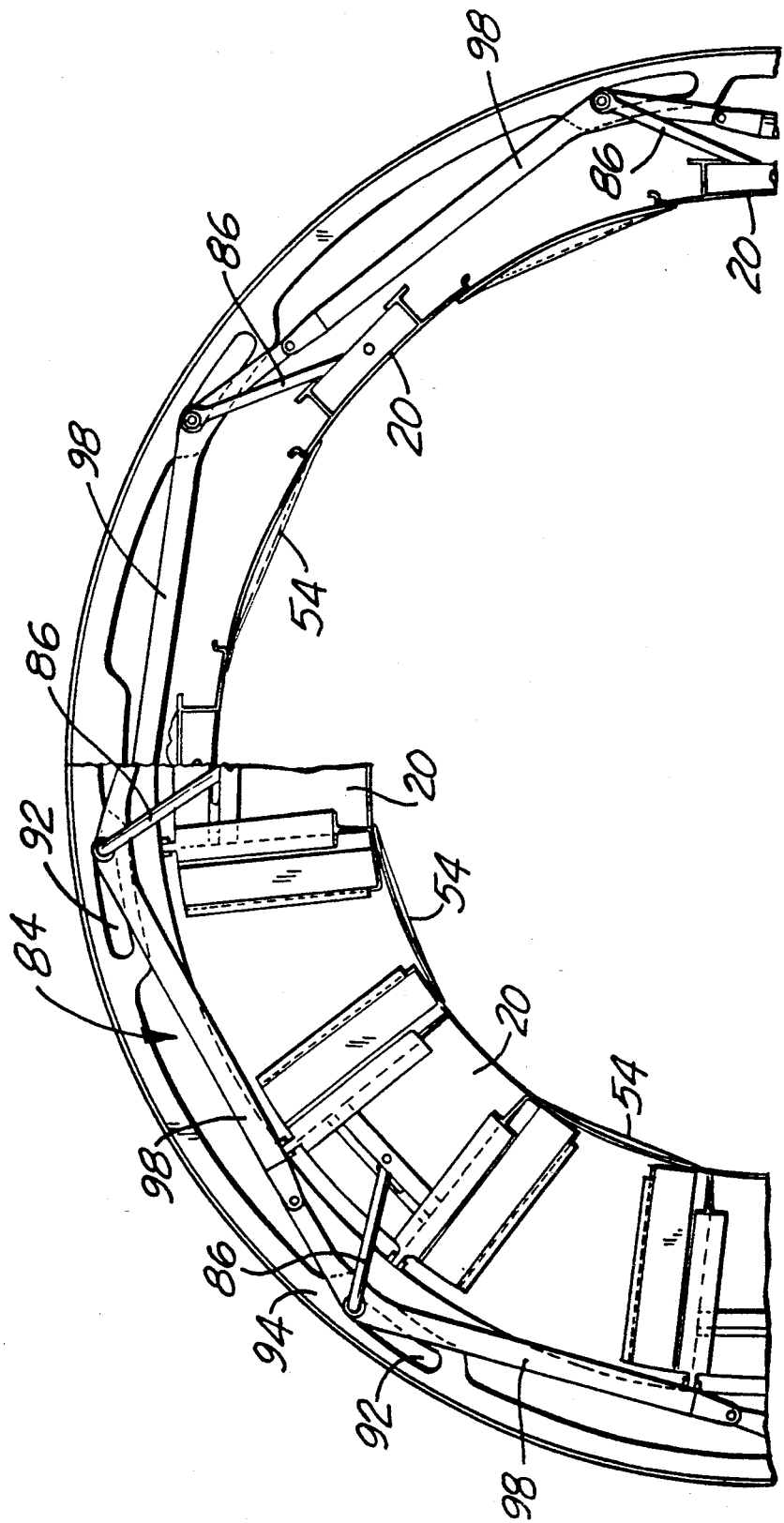
FIG. 6 is an end view of one half of a nozzle looking in from the rear of the nozzle with the actuators removed to show the synchronizing mechanism.

Symmetry controller 84 as shown in FIG. 6 which has the actuators 42 and pedestals 46 removed for clarity, comprises a plurality of individual links 86, each attached at its inner end to an individual convergent flap 20 through a universal connector 88 (FIG. 2) which provide a full range of motion The outer end of each link 86 is provided with a roller 90 which travels in a slot 92 in a synchronization ring 94. The slots 92 may be in an independent structure such as individual housings depending from the outer engine structure. The ring 94 as shown in FIG. 3 is supported by the outer engine structure 96 and the exhaust duct walls 34. The contour of each slot conforms to the contour of each roller 90 to provide a universal connection with a full range of motion. As shown in FIG. 5 and 6, the outer end of each link 86 is connected to the outer ends of the adjacent links by connecting links 98, each of which is pivotally attached to the end of a link 86.

The slots 92 are positioned so that rollers 90 will be at the left end of each slot when the flaps are at maximum opening and at the right end of each slot when the flaps are at a minimum opening. In addition, each slot is in the same relative position with respect to its associated flap. Any motion of a convergent flap is transmitted to every other convergent flap through its associated link 86 and through the connecting links 98. Since kinematically the movement of each flap in a flap set is transmitted to the other flaps in the set in a predetermined ratio, movement of any flap in the nozzle will cause identical movement throughout the nozzle.

Accordingly, when actuators 42 move divergent flaps 22, convergent flaps 20 and outer flaps 18 move in fixed relationships and through the symmetry controller 84 maintain the nozzle round and symmetrical throughout the range of area variation, even in the presence of significantly different nozzle flap pressure loads as one confronts in flight maneuvers and thrust vectorable nozzles.

As shown in FIG. 6 on the left side of center, the convergent flaps 20 are at minimum throat area and on the right side of center at maximum throat area. Conventional flap seals 54 are provided between each pair of flaps. As the flaps 20 move, the links 86 both arcuately rotate up and down with the flaps and simultaneously the rollers 90 and outer ends of the links move tangentially in the slots 92.

The symmetry controller permits the use of unsynchronized, low cost actuators without the need for heavy structures such as heavy duty actuation rings, cams and the like. Furthermore, the pistons 32 which permit independent control of the discharge area, use a light weight actuation ring. This is made possible by coordinating the actuation of actuators 42 and pistons 32 so that the heavy forces are handled by actuators 42.

Figure 7:
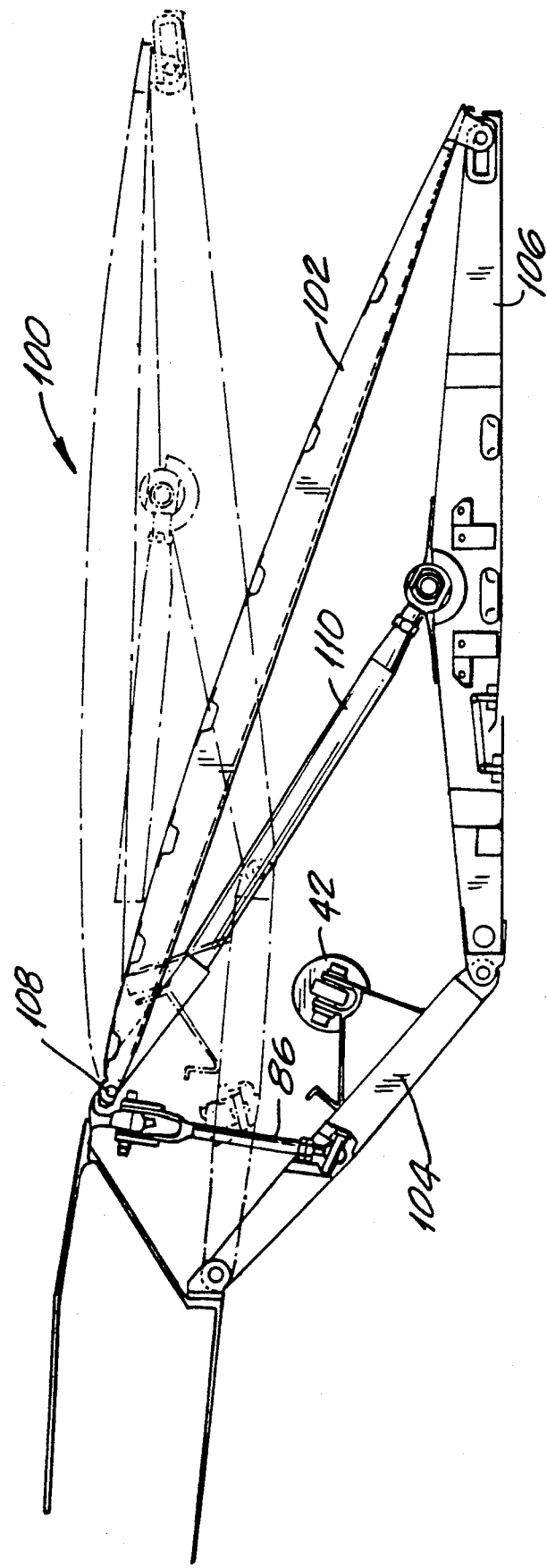
FIG. 7 is a view of an alternate embodiment showing a single set of exhaust flaps of a nozzle having fixed ratio throat and discharge areas with flap actuators mounted on convergent flaps made in accordance with the principles of the present invention.

Referring to FIG. 7, an alternate embodiment of the present invention is shown. Flap set 100 has an outer flap 102, a convergent flap 104 and a divergent flap 106. The forward end of the outer flap 102 is pivotally mounted by pin 108 to the engine structure. There is no independent actuation of the outer flap 102 and therefore no independent control of the discharge area. A compression link 110 is provided to complete the kinematic linkage. In this embodiment, actuator 42 is mounted on convergent flap 104 along with link 86 which is connected to the convergent flap 104. The symmetry controller and the fluid supply arrangement (not shown) are the same as described in the preferred embodiment.

Since the flaps in each set move in fixed relationships to each other, when actuators move convergent flaps 104, the symmetry controller 84 keeps all the convergent flaps moving together and consequently all flaps move together and keep the nozzle in symmetry. In addition, since the fluid supply prevents flexing of the supply and return tubes 70, 72, there is no stressing of the tubes. It should be noted that the fluid supply arrangement and symmetry controller are equally applicable to convergent nozzles.

There has been described a preferred and an alternate embodiment of the invention. However, it should be understood that various changes and modifications may be made thereto without departing from the spirit and scope of the invention.

I claim:

1. An exhaust nozzle actuation mechanism for a jet engine, comprising:
    an engine structure of said jet engine defining an exhaust duct for conveying combustion discharge gases to the exhaust nozzle;
    a plurality of first flaps, each having a forward end and an aft end, each pivotally attached at its forward end to the engine structure and positioned circumferentially to form an exhaust path;
    a symmetry controller including a plurality of first links having inner and outer ends, each having an inner end attached to an individual first flap, and a plurality of connecting links, each connected to an outer end of an individual first link so that all first links are interconnected by the connecting links so that movement of any one of the first flaps is transmitted to and moves all other first flaps to maintain the circumferential symmetry of the exhaust path; and
    means mounted on said engine structure for limiting the movement of the connecting links so that movement of any one of the first flaps is accurately transmitted to all other first flaps.

2. An exhaust nozzle actuation mechanism for a jet engine according to claim 1, wherein:
    said means for limiting movement comprises a plurality of slots mounted on said engine structure; and
    each of said first links having a roller at the outer end which rides in one of said slots.

3. An exhaust nozzle actuation mechanism for a jet engine according to claim 2, wherein:
    each slot is positioned relative to its associated flap in the same position as each other slot and its associated flap, and the length of each slot being selected so that each roller is at one end of its associated slot when the flaps are at maximum opening and each roller is at the other end of its associated slot when the flaps are at minimum opening.

4. An exhaust nozzle actuation mechanism for a jet engine according to claim 3, further comprising:
    actuation means mounted on the first flaps which when actuated causes the flaps to move up and down, said actuation means moving up and down with the first flaps and moving tangentially as the flaps move.

5. An exhaust nozzle actuation mechanism for a jet engine according to claim 4, wherein:
    said actuation means comprises a plurality of fluid actuated actuators each having a first end and a second end, each actuator having its first end connected to a first flap and its second end connected to an adjacent flap, the number of actuators being equal to the number of flaps so that each actuator is connected to two adjacent flaps.

6. An exhaust nozzle actuation mechanism for a jet engine according to claim 5, further comprising:
    a fluid carrying means connected to each actuator for movement therewith.

7. An exhaust nozzle actuation mechanism for a jet engine according to claim 6, wherein:
    the fluid carrying means includes a fluid supply manifold mounted for tangential movement on an engine structure, a plurality of rotary unions connected to the manifold, a supply tube and strut connected to each of the rotary unions so that a supply tube and strut can rotate about each union, each supply tube and strut being connected to one of said actuators so that as each actuator moves up and down and tangentially, its supply tube and strut move up and down and tangentially.

8. An exhaust nozzle actuation mechanism for a jet engine according to claim 1, further comprising:
    a plurality of second flaps each having a forward end and an aft end, each one pivotally attached at its forward end to the aft end of one of the first flaps and positioned circumferentially to form an exhaust path;
    actuation means mounted on the second flaps which when actuated causes the second flaps to move up and down, said actuation means moving up and down with the second flaps and moving tangentially as the flaps move; and means for imparting movement of the second flaps to the first flaps and movement of the first flaps to the second flaps so that the symmetry controller connected to each of the first flaps causes the first flaps to move uniformly and the second flaps to move uniformly.

9. An exhaust nozzle actuation mechanism according to claim 8, wherein:

said actuation means comprises a plurality of fluid actuated actuators each having a first end and a second end, each actuator having its first end connected to a second flap and its second end connected to an adjacent second flap, the number of actuators being equal to the number of second flaps so that each actuator is connected to two adjacent second flaps.

10. An exhaust nozzle actuation mechanism according to claim 9, further comprising, a fluid carrying means connected to each actuator for movement therewith.

11. An exhaust nozzle actuation mechanism according to claim 10, wherein:

the fluid carrying means includes a fluid supply manifold mounted for tangential movement on an engine structure, a plurality of rotary unions connected to the manifold, a supply tube and strut connected to each of the rotary unions so that a supply tube and strut can rotate about each union, each supply tube and strut being connected to one of said actuators so that as each actuator moves up and down and tangentially, its supply tube and strut move up and down and tangentially.

12. An exhaust nozzle actuation mechanism according to claim 11, wherein:

said means for limiting movement comprises a plurality of slots mounted on said engine structure; and each of said first links having a roller at the outer end which rides in one of said slots.

13. An exhaust nozzle actuation mechanism according to claim 12, wherein:

each slot is positioned relative to its associated flap in the same position as each other slot and its associated flap, and the length of each slot being selected so that each roller is at one end of its associated slot when the flaps are at maximum opening and each roller is at the other end of its associated slot when the flaps are at minimum opening.

14. A jet engine exhaust nozzle fluid supply for actuators mounted on nozzle flaps, comprising:

a plurality of exhaust nozzle flap sets circumferentially spaced to form an exhaust nozzle, each flap set consisting of an outer flap, a convergent flap and a divergent flap, each flap having a forward end and an aft end, said forward end of the outer flap being mounted for pivotal movement and said aft end of the outer flap being pivotally secured to the aft end of the divergent flap, said forward end of the divergent flap being pivotally secured to the aft end of the convergent flap, and said forward end of the convergent flap being mounted for pivotal movement, said outer, divergent and convergent flaps defining an annular flap space therebetween;

a plurality of actuators positioned circumferentially in said annular flap space, each actuator being mounted on two adjacent divergent flaps for movement therewith; and a fluid supply connected to each actuator, the fluid supply including a rotary union for each actuator and a supply tube and strut connecting each rotary union to an actuator so that the supply tube and strut move up and down about the rotary union as its connected actuator moves up and down with the divergent flaps.

15. An exhaust nozzle fluid supply according to claim 14, which further comprises:

means for mounting the rotary unions on the engine structure for tangential movement.

16. A jet engine exhaust nozzle fluid supply for actuators mounted on nozzle flaps, comprising:

a plurality of exhaust nozzle flap sets circumferentially spaced to form an exhaust nozzle, each flap set consisting of an outer flap, a convergent flap and a divergent flap, each flap having a forward end and an aft end, said forward end of the outer flap being mounted for pivotal movement and said aft end of the outer flap being pivotally secured to the aft end of the divergent flap, said forward end of the divergent flap being pivotally secured to the aft end of the convergent flap, and said forward end of the convergent flap being mounted for pivotal movement, said outer, divergent and convergent flaps defining an annular flap space therebetween;

a plurality of actuators positioned circumferentially in said annular flap space, each actuator being mounted on two adjacent convergent flaps for movement therewith; and a fluid supply connected to each actuator, the fluid supply including a rotary union for each actuator and a supply tube and strut connecting each rotary union to an actuator so that the supply tube and strut move up and down about the rotary union as its connected actuator moves up and down with the convergent flaps.

17. An exhaust nozzle fluid supply according to claim 16, which further comprises:

means for mounting the rotary unions on the engine structure for tangential movement.

* * * * *